US006899019B2

(12) United States Patent
Han et al.

(10) Patent No.: US 6,899,019 B2
(45) Date of Patent: May 31, 2005

(54) GRILLING APPARATUS

(75) Inventors: Yong-Woon Han, Kunpo (KR);
Seong-Deog Jang, Suwon (KR);
Han-Seong Kang, Suwon (KR);
Joo-Yong Yeo, Suwon (KR); Dae-Sung Han, Hwasung (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 0 days.

(21) Appl. No.: 10/361,645

(22) Filed: Feb. 11, 2003

(65) Prior Publication Data

US 2004/0069150 A1 Apr. 15, 2004

(30) Foreign Application Priority Data

Oct. 12, 2002 (KR) ................................ 10-2002-0062296

(51) Int. Cl.[7] ................................................ A47J 37/06
(52) U.S. Cl. ............................ 99/338; 99/391; 99/426; 99/447
(58) Field of Search ......................... 99/337, 338, 339, 99/426, 447, 450, 389, 391; 126/152 B, 25 R, 29

(56) References Cited

U.S. PATENT DOCUMENTS 3,693,538 A * 9/1972 Synder ....................... 99/447
4,632,089 A * 12/1986 Wardell ..................... 126/25 R
5,092,311 A * 3/1992 Ririe ......................... 126/25 R
5,189,945 A    3/1993 Hennick
5,498,757 A * 3/1996 Johnson et al. ............. 426/520
5,680,810 A   10/1997 Sham
5,735,191 A    4/1998 Russell et al.
6,158,426 A * 12/2000 Wardell ..................... 126/25 R

FOREIGN PATENT DOCUMENTS

| DE | 100 09 515 | 9/2001 |
|---|---|---|
| FR | 2 701 826 | 9/1994 |
| JP | 2001-120440 | 5/2001 |

* cited by examiner

Primary Examiner—Reginald L. Alexander
(74) Attorney, Agent, or Firm—Staas & Halsey LLP

(57) ABSTRACT

A grilling apparatus is provided with a grill of an improved structure, thus preventing food from being burnt due to overheating of the grill and reducing a cooking period to cook the food. The grilling apparatus includes a cabinet defining an external appearance of the grilling apparatus. An opening is formed at a top of the cabinet. A grill comprises a plurality of pipes, is set in the cabinet through the opening of the cabinet, and is downwardly bent, at a portion thereof, to form a food supporting part supporting opposite side surfaces of the food. The grilling apparatus includes two water tanks which are connected to respective ends of the plurality of pipes to supply the water to the plurality of pipes. One or more heating units are provided at predetermined positions adjacent to respective sides of the food supporting part in the cabinet so as to irradiate heat to the food supporting part.

15 Claims, 3 Drawing Sheets

GRILLING APPARATUS

CROSS-REFERENCE TO RELATED APPLICATION

This application claims the benefit of Korean Application No. 2002-62296, filed Oct. 12, 2002, in the Korean Intellectual Property Office, the disclosure of which is incorporated herein by reference.

BACKGROUND OF THE INVENTION

1. Field of the Invention

The present invention relates, in general, to grilling apparatuses and, more particularly, to a grilling apparatus which is provided with a grill of an improved structure, thus preventing food from being burnt due to an overheating of the grill and reducing a cooking period to cook the food.

2. Description of the Related Art

As is well known to those skilled in the art, a grilling apparatus includes a grill on which food is placed, and a heating unit heating the food to cook the food.

A method of cooking the food using the grilling apparatus constructed in this way is as follows. When the heating unit is heated after laying the food on the grill, heat generated from the heating unit is transmitted to the food through the grill, thus cooking the food.

However, a conventional grilling apparatus has problems which will be described in the following.

When the grill is excessively overheated by the heating unit during cooking of the food, the food, which is in contact with the grill, is easily and undesirably burnt, and further, the food may be scorched and may stick to the grill.

Further, the conventional grilling apparatus is designed to heat only one side of the food, so that the food must be frequently turned over during cooking of the food so as to uniformly heat both sides of the food, thus causing inconvenience to a user.

SUMMARY OF THE INVENTION

Accordingly, it is an aspect of the present invention to provide a grilling apparatus which is provided with a grill of an improved structure, thus preventing food from being burnt due to an overheating of the grill and reducing a cooking period to cook the food.

Additional aspects and/or advantages of the invention will be set forth in part in the description which follows and, in part, will be obvious from the description, or may be learned by practice of the invention.

The above and/or other aspects of the present invention are achieved by providing a grilling apparatus, including a cabinet defining an external appearance of the grilling apparatus, with an opening formed at a top of the cabinet, a grill comprising a plurality of pipes and set in the cabinet through the top opening, the grill being downwardly bent, at a portion thereof, to form a food supporting part to support opposite side surfaces of the food, two water tanks connected to respective ends of each of the plurality of the pipes to supply water to each of the pipes, and a heating unit provided at predetermined positions adjacent to respective sides of the food supporting part in the cabinet so as to irradiate heat to the food supporting part.

The food supporting part may be one or more in number.

Further, each of the water tanks may be provided with a cap, the cap may be openable to refill the water tank with water.

The heating unit may comprise a heater with a heat reflecting plate, with electric heating elements being arranged on the reflecting plate.

Furthermore, a water level sensor may be provided in the water tank to sense an amount of the water contained in the water tank.

Each of the water tanks may be seated on a seating part which may be provided on each side of the top opening of the cabinet.

BRIEF DESCRIPTION OF THE DRAWINGS

These and other aspects and advantages of the invention will become apparent and more readily appreciated from the following description of the preferred embodiments, taken in conjunction with the accompanying drawings of which.

DETAILED DESCRIPTION OF THE PREFERRED EMBODIMENT

Figure 1:
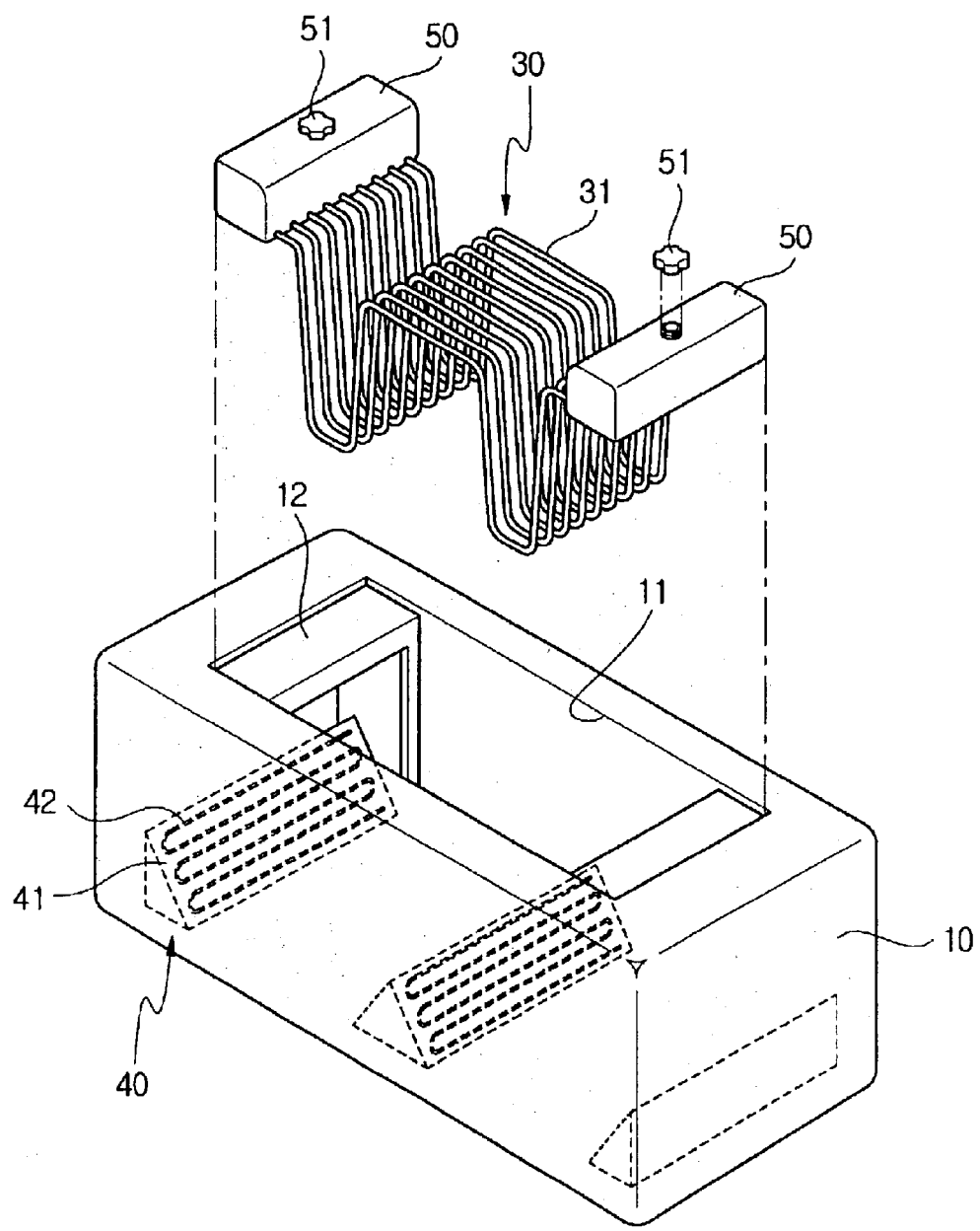
FIG. 1 is an exploded perspective view showing a grilling apparatus according to an embodiment of the present invention.

Reference will now be made in detail to the present preferred embodiment of the present invention, examples of which are illustrated in the accompanying drawings, wherein like reference numerals refer to like elements throughout. The embodiment is described below in order to explain the present invention by referring to the figures.

Figure 2:
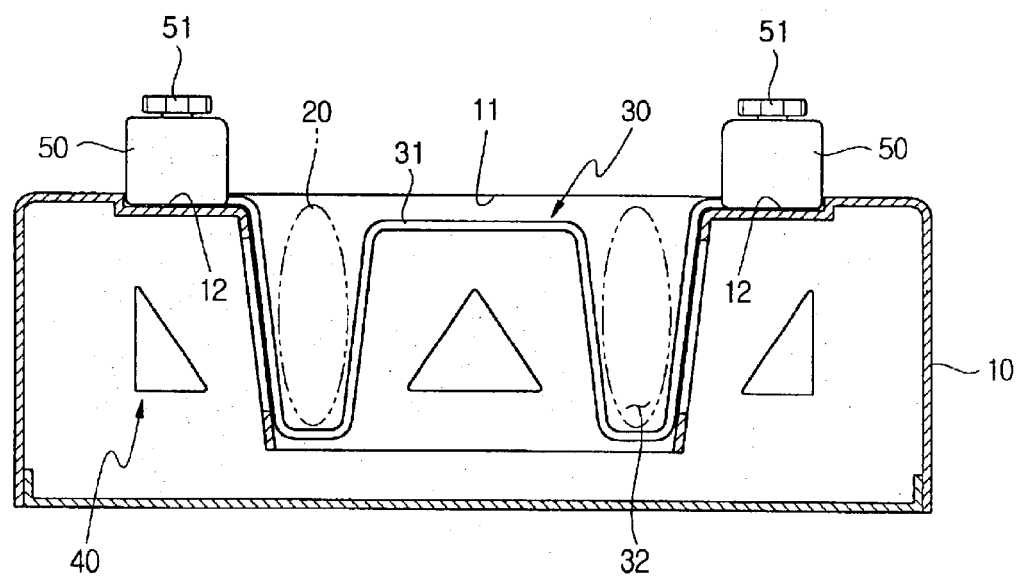
FIG. 2 is a sectional view of the grilling apparatus of FIG. 1.

A grilling apparatus according to an embodiment of the present invention serves to prevent food from being burnt due to overheating of a grill and serves to reduce a cooking period of the food. As illustrated in FIGS. 1 and 2, the grilling apparatus includes a cabinet 10 which defines an external appearance of the grilling apparatus and is opened at a top thereof to form an opening 11. A grill 30 on which food 20 is placed is set in the cabinet 10 through the opening 11. A heating unit 40 is installed in the cabinet 10 to heat the food 20.

The grill 30 includes a plurality of pipes 31 to support the food 20 to be cooked. Two water tanks 50 are connected to respective ends of each of the plurality of the pipes 31 to supply water to each of the pipes 31. Therefore, although heat generated from the heating unit 40 is transmitted to each of the pipes 31 of the grill 30 during cooking of the food 20, each of the pipes 31 is not heated above a predetermined temperature of 100° C., because the water circulates in each of the pipes 31, thus preventing an overheating of the grill 30 during cooking of the food 20 and preventing the food 20 from being undesirably burnt due to overheating of the grill 30.

Each of the water tanks 50 is seated, respectively, on a seating part 12 which is provided on each side of the opening 11 of the cabinet 10. The grill 30 is set in the opening 11 between the two water tanks 50, and is downwardly bent, at a portion thereof, to form a food supporting part 32 supporting both side surfaces of food 20. The food supporting part 32 is positioned in the cabinet 10 below the opening 11.

Further, the heating units 40 are provided at predetermined positions adjacent to both sides of the food supporting part 32 in the cabinet 10 so as to allow simultaneous heating of both of the side surfaces of the food 20 which is supported by the food supporting part 32. The grilling apparatus allows both of the side surfaces of the food 20 to be simultaneously cooked by the food supporting part 32 and the heating unit 40, so the user does not need to turn the food 20 over during cooking of the food 20, thus reducing the cooking time of the food 20.

Since the heating unit 40 comprises one or more heat reflecting plates 41 on which electric heating elements 42 are arranged, heat generated from the electric heating elements 42 is reflected by the reflecting plate 41, thus enhancing the heating efficiency of the heater unit 40.

Several food supporting parts 32 may be formed on the grill 30 so as to simultaneously cook a large amount of the food 20 using the grilling apparatus. In this case, a number of the heating units 40, which are provided, respectively, at predetermined positions adjacent to respective sides of the food supporting parts 32, is increased corresponding to a number of the food supporting parts 32. That is, the number of the food supporting parts 32 may be, for example, two. In this case, three heating units 40 are required to be provided at positions adjacent to respective sides of the food supporting parts 32. The heating units 40 may be provided between the two food supporting parts 32, respectively, to irradiate heat such that the two food supporting parts 32 are heated at a same time.

Figure 3:
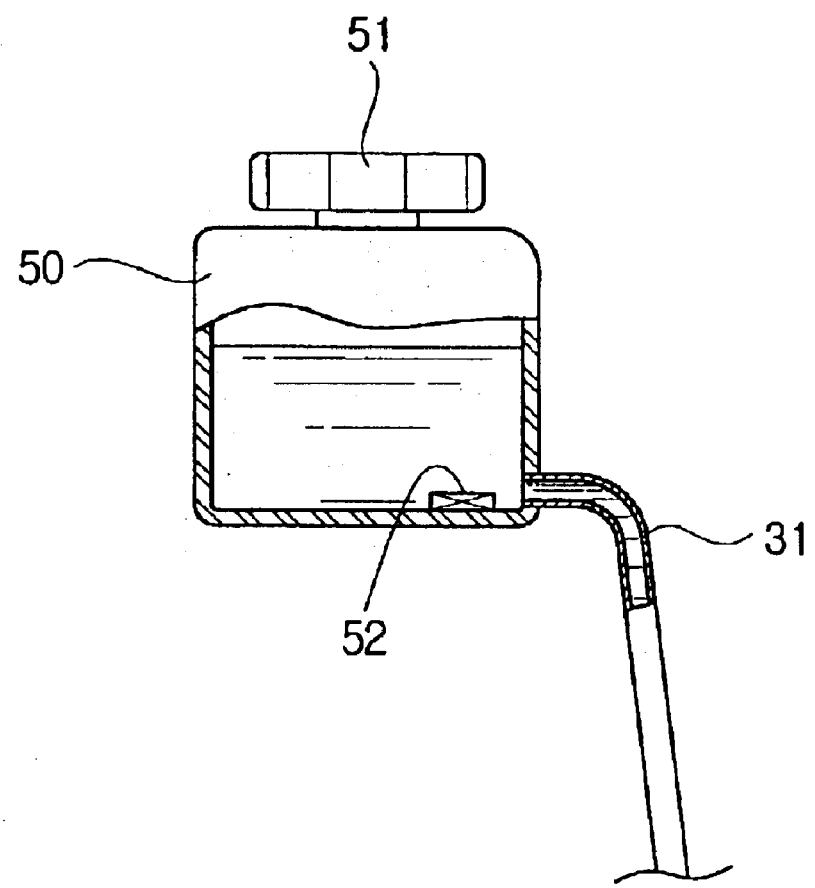
FIG. 3 is a partial sectional view showing a water tank and a pipe included in the grilling apparatus of FIG. 1.

Each of the water tanks 50 is provided at a portion thereof with a cap 51. The cap 51 is opened at a top thereof to refill the water tanks 50 with water. As illustrated in FIG. 3, a water level sensor 52 is provided in each of the water tanks 50 to sense an amount of the water contained in each of the water tanks 50.

Each of the water level sensors 52 senses the amount of the water contained in one of the water tanks 50 so as to prevent the water in each one of the water tanks 50 from being reduced below a predetermined amount due to an evaporation of the water, thus preventing the food 20 from being burnt or charred due to overheating of the grill 30. Further, each of the water level sensors 52 is connected to an alarm buzzer (not shown) or an alarm lamp (not shown). When a respective water level sensor 52 senses that an amount of the water contained in a respective water tank 50 is less than the predetermined amount, the alarm buzzer emits an alarm sound or the alarm lamp is lit such that a user easily notices a lack of the water contained in the respective water tank 50.

The operation and effect of the grilling apparatus according to the present invention will be described in the following in detail.

When cooking the food 20 using the grilling apparatus is desired, the cap 51 is opened and an appropriate amount of the water is supplied to each of the water tanks 50 so that the water is fed into each of the plurality of the pipes 31 of the grill 30 which communicates with the water tanks 50. Next, the food 20, such as meat or bread, is placed in the food supporting part 32, and the one or more heating units 40 start operating. At this time, heat generated from the one or more heating units 40 is transmitted to the food 20 to cook the food 20 supported in the food supporting part 32.

In this case, heat generated from the one or more heating units 40 is simultaneously transmitted to the food 20, as well as to the grill 30. However, the grill 30 is not heated above a predetermined temperature of 100° C., because the water circulates in each of the plurality of pipes 31 constituting the grill 30. Since the grill 30 is not overheated, the food 20, which is in contact with the grill 30, is not burnt, and the food 20 does not get scorched and/or stick to the grill 30, thus allowing the grill 30 to be easily cleaned. Further, the food 20 is suitably cooked by only the heat generated from the one or more heating units 40.

While cooking the food 20, opposite side surfaces of the food 20 are simultaneously cooked due to the food supporting part 32 of the grill 30 being designed to support the opposite side surfaces of the food 20 and the one or more heating units 40 being designed to radiate heat in opposite directions toward the opposite side surfaces of the food 20. Therefore, the user does not need to turn the food 20 over during cooking of the food 20, thus reducing a cooking period to cook the food 20 and increasing convenience of use of the cooking apparatus.

As is apparent from the above description, the a grilling apparatus, which is designed such that water is circulated in a grill and heat generated from a heating unit is simultaneously transmitted to opposite side surfaces of food is provided, thus preventing the food from being burnt due to an overheating of the grill, and reducing a cooking period to cook the food.

Although an embodiment of the present invention has been shown and described, it would be appreciated by those skilled in the art that changes may be made in this embodiment without departing from the principles and spirit of the invention, the scope of which is defined in the claims and their equivalents.

What is claimed is:

1. A grilling apparatus, comprising:
    a cabinet defining an external appearance of the grilling apparatus, with an opening formed at a top of the cabinet;
    a grill including a plurality of pipes and set in the cabinet through the opening thereof, the grill being downwardly bent, at a portion thereof, to form a food supporting part to support opposite side surfaces of the food;
    two water tanks connected to respective ends of the plurality of pipes to supply water to the plurality of pipes; and
    one or more heating units provided at predetermined positions adjacent to opposite sides of the food supporting part in the cabinet so as to irradiate heat to the food supporting part to simultaneously heat the opposite sides of the food.

2. The grilling apparatus according to claim 1, wherein the food supporting part is one or plural food supporting parts set at respective portions of the grill.

3. The grilling apparatus according to claim 1, wherein each of the water tanks is provided with a cap, each cap being openable to refill each of the water tanks with the water.

4. The grilling apparatus according to claim 1, wherein each of the heating units comprises:
    a heat reflecting plate; and
    electric heating elements arranged on the heat reflecting plate.

5. The grilling apparatus according to claim 1, wherein each of the water tanks comprises:
    a water level sensor provided in the water tank to sense an amount of the water contained therein.

6. The grilling apparatus according to claim 1, further comprising:
    seating parts,
    wherein each of the water tanks is seated on a respective one of seating parts which is provided on each side of the opening of the cabinet.

7. A grilling apparatus, comprising:

a grill comprising:

plural pipes with one or more portions thereof formed to support opposite side surfaces of food placed at the one or more portions;

plural tanks operatively connected to respective ends of the plural pipes to supply water to each of the plural pipes; and one or more heating units provided at respective positions adjacent to the one or more portions supporting the opposite side surfaces of the food so that the food is heatable on the opposite side surfaces thereof simultaneously.

8. The grilling apparatus according to claim 7, wherein each of the plural tanks comprises:

a cap, the cap of each of the plural tanks being openable to refill each of the plural tanks with the water.

9. The grilling apparatus according to claim 7, wherein each of the one or more heating unit comprises:

a heat reflecting plate; and electric heating elements arranged on the heat reflecting plate.

10. The grilling apparatus according to claim 7, wherein each of the plural tanks comprises:

a water level sensor provided therein to sense an amount of the water contained in a respective tank and provides an audio and/or visual alarm when the sensed amount of water is less than a designated amount.

11. The grilling apparatus according to claim 7, further comprising:

seating parts provided to seat the plural tanks, respectively, at respective opposite ends of the grill.

12. A grilling apparatus, comprising:

a grill comprising:

plural pipes with one or more portions thereof formed to support opposite side surfaces of food placed at the one or more portions, and one or more cooling units operatively connected to the plural pipes to supply cooling liquid to each of the plural pipes; and one or more heating units provided at respective positions adjacent to the one or more portions supporting the opposite side surfaces of the food so that the food is heatable on the opposite side surfaces thereof simultaneously.

13. The grilling apparatus according to claim 12, wherein the one or more cooling units maintain the grill at temperature in a range of less than or equal to 100° C.

14. The grilling apparatus according to claim 12, wherein the cooling liquid is water.

15. The grilling apparatus according to claim 12, wherein each of the cooling units comprises:

a water level sensor provided to sense an amount of the cooling liquid contained in the cooling unit and provides an audio and/or visual alarm when the sensed amount of cooling liquid is less than a designated amount of the cooling liquid.

* * * * *